(12) United States Patent
Watanabe

(10) Patent No.: US 9,426,580 B2
(45) Date of Patent: Aug. 23, 2016

(54) ELECTRONIC APPARATUS AND PANEL UNIT

(71) Applicant: KYOCERA CORPORATION, Kyoto (JP)

(72) Inventor: Takaaki Watanabe, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/402,773

(22) PCT Filed: May 21, 2013

(86) PCT No.: PCT/JP2013/003225
§ 371 (c)(1),
(2) Date: Nov. 21, 2014

(87) PCT Pub. No.: WO2013/175765
PCT Pub. Date: Nov. 28, 2013

(65) Prior Publication Data
US 2015/0146892 A1    May 28, 2015

(30) Foreign Application Priority Data

May 22, 2012 (JP) .................................. 2012-116964

(51) Int. Cl.
*H04R 25/00* (2006.01)
*H04R 17/00* (2006.01)
(Continued)

(52) U.S. Cl.
CPC .............. *H04R 17/00* (2013.01); *B06B 1/0603* (2013.01); *B06B 1/0611* (2013.01);
(Continued)

(58) Field of Classification Search
CPC ........ H04R 7/04; H04R 17/00; H04R 17/005; H04R 17/025; H04R 17/10; H04R 25/00; H04R 25/606; H04R 2217/01; H04R 2217/03; H04R 2499/11; H04R 2499/15; H04R 2440/01; H04R 2440/05; H04R 2460/13; H04M 1/03
USPC ........... 381/86, 306, 333, 151, 152, 173, 174, 381/190, 386, 326, 380, 388; 310/324, 328, 310/334
See application file for complete search history.

(56) References Cited

U.S. PATENT DOCUMENTS 4,352,961 A * 10/1982 Kumada et al. ............... 455/350
6,320,967 B1 * 11/2001 Azima et al. .................... 381/86
(Continued)

FOREIGN PATENT DOCUMENTS

| EP | 1501074 A2 | 1/2005 |
| EP | 1542064 A1 | 6/2005 |

(Continued)

OTHER PUBLICATIONS

International Search Report; PCT/JP2013/003225; Aug. 13, 2013.
(Continued)

*Primary Examiner* — Huyen D Le
(74) *Attorney, Agent, or Firm* — Studebaker & Brackett PC

(57) ABSTRACT

An electronic apparatus that generates a vibration sound by vibrating a panel and may operate in an excellent manner is provided. An electronic apparatus 1 according to the present invention includes a housing 60, a first piezoelectric element 30, a second piezoelectric element 31, and a panel 10 that is vibrated by the first piezoelectric element 30 and the second piezoelectric element 31 and generates the vibration sound to be transmitted through a part of a human body.

8 Claims, 9 Drawing Sheets

(51) Int. Cl.
*B06B 1/06* (2006.01)
*H04M 1/02* (2006.01)
*H04R 7/04* (2006.01)
*H04R 1/00* (2006.01)
*H04R 1/02* (2006.01)
*H04M 1/03* (2006.01)
*H04R 3/02* (2006.01)

(52) U.S. Cl.
CPC ............. *H04M 1/0266* (2013.01); *H04R 1/00* (2013.01); *H04R 1/02* (2013.01); *H04R 1/028* (2013.01); *H04R 7/04* (2013.01); *H04R 7/045* (2013.01); *H04M 1/03* (2013.01); *H04R 3/02* (2013.01); *H04R 2400/03* (2013.01); *H04R 2460/13* (2013.01); *H04R 2499/11* (2013.01); *H04R 2499/15* (2013.01)

(56) References Cited

U.S. PATENT DOCUMENTS

| | | | |
|---|---|---|---|
| 7,151,837 B2* | 12/2006 | Bank et al. | 381/190 |
| 2005/0023937 A1 | 2/2005 | Sashida et al. | |
| 2006/0039575 A1* | 2/2006 | Wada | H04R 1/025 381/152 |
| 2006/0227981 A1* | 10/2006 | Miyata | 381/124 |
| 2010/0225600 A1* | 9/2010 | Dai et al. | 345/173 |
| 2015/0043758 A1* | 2/2015 | Yamada et al. | 381/151 |
| 2015/0054779 A1* | 2/2015 | Horii et al. | 345/174 |
| 2015/0078588 A1* | 3/2015 | Umehara et al. | 381/151 |
| 2015/0086047 A1* | 3/2015 | Horii et al. | 381/151 |

FOREIGN PATENT DOCUMENTS

| | | |
|---|---|---|
| JP | S64-36195 A | 2/1989 |
| JP | 2004-187031 A | 7/2004 |
| JP | 2005-045691 A | 2/2005 |
| JP | 2005-175553 A | 6/2005 |
| JP | 2005-348193 A | 12/2005 |
| JP | 2006-108872 A | 4/2006 |
| JP | 2007-082009 A | 3/2007 |
| JP | 2011-091719 A | 5/2011 |
| JP | 2013-207796 A | 10/2013 |
| WO | 00/13464 A1 | 3/2000 |

OTHER PUBLICATIONS

Written Opinion of the International Searching Authority; PCT/JP2013/003225; Aug. 13, 2013; with concise explanation.
The extended European search report issued by the European Patent Office on Apr. 26, 2016, which corresponds to European Patent Application No. 13794639.8-1559 and is related to U.S. Appl. No. 13/133,341.

* cited by examiner

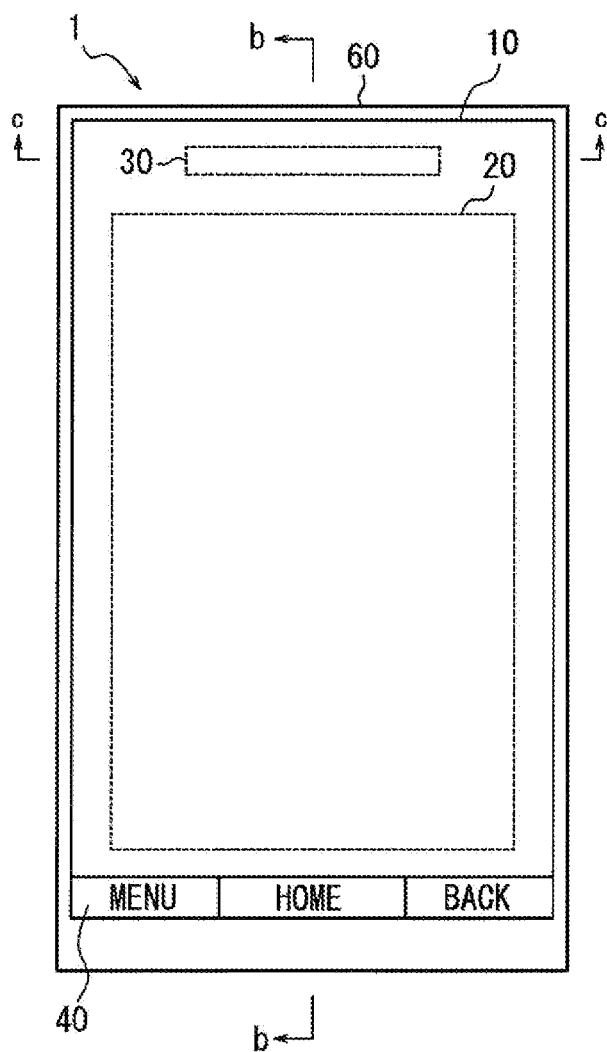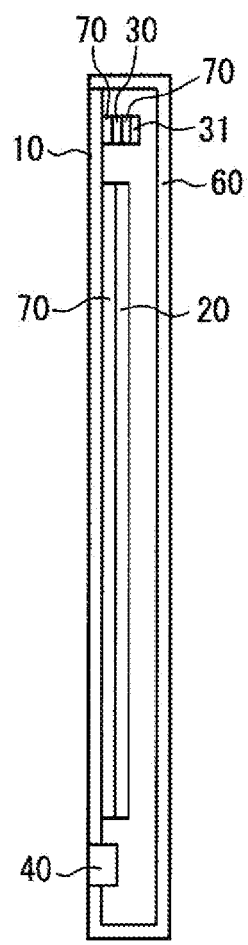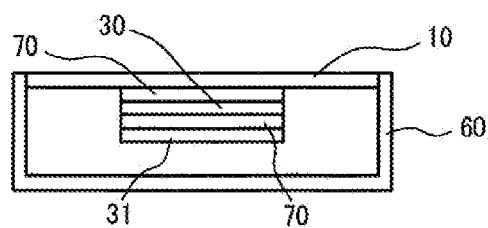

ELECTRONIC APPARATUS AND PANEL UNIT

CROSS REFERENCE TO RELATED APPLICATION

This application claims priority to and the benefit of Japanese Patent Application No. 2012-116964 filed on May 22, 2012, the entire contents of which are incorporated herein by reference.

TECHNICAL FIELD

The present invention relates to an electronic apparatus for vibrating a panel by applying a predetermined electrical signal (sound signal) to a piezoelectric element and for delivering an air conduction sound and a vibration sound to a user by delivering the vibration of the panel to a user's body.

BACKGROUND ART

Patent Document 1 describes an electronic apparatus such as a mobile phone that delivers an air conduction sound and a bone conduction sound to a user. Patent Document 1 also describes that the air conduction sound is a sound that is delivered to the auditory nerve of the user when vibration of the air caused by vibration of an object reaches the eardrum through the ear canal and vibrates the eardrum. Patent Document 1 further describes that the vibration sound is a sound that is delivered to the auditory nerve of the user via a part of a user's body (for example, the cartilage of the ear) in contact with an object being vibrating.

In the phone described in Patent Document 1, a vibrator in the form of a short rectangular plate formed by a piezoelectric bimorph and a flexible material is attached to an outer surface of a housing via an elastic member. Patent Document 1 also describes that, upon application of a voltage to the piezoelectric bimorph of the vibrator, a piezoelectric material stretches in a longitudinal direction causing bending vibration of the vibrator and thus, when the user brings the vibrator into contact with the auricle, the air conduction sound and the vibration sound are delivered to the user.

RELATED ART DOCUMENT

Patent Document

Patent Document 1: Japanese Patent Application Laid-Open Publication No. 2005-348193

SUMMARY OF INVENTION

Technical Problem

The electronic apparatus described in Patent Document 1 includes the vibrator attached to the outer surface of the housing of the mobile phone and the like, and therefore does not consider an electronic apparatus having a panel serving as a diaphragm mounted on the housing.

An object of the present invention is to provide an electronic apparatus that generates the vibration sound by vibrating the panel and may operate in an excellent manner.

Solution to Problem

An electronic apparatus according to the present invention includes:
a housing;
a plurality of piezoelectric elements; and
a panel to be vibrated by the plurality of piezoelectric elements that generates a vibration sound to be transmitted through a part of a human body.

The panel may generate the vibration sound and an air conduction sound.

The plurality of piezoelectric elements may be arranged overlapping with one another in a thickness direction of the panel.

The plurality of piezoelectric elements may include:
a first piezoelectric element disposed on one surface of the panel; and
a second piezoelectric element disposed overlapping with the first piezoelectric element.

The electronic apparatus may further include a joint member for joining the first piezoelectric element and the second piezoelectric element together.

The electronic apparatus may further include a reinforcing member disposed between the panel and the first piezoelectric element, or between the first piezoelectric element and the second piezoelectric element, or at a position opposite to the first piezoelectric element with respect to the second piezoelectric element.

The plurality of piezoelectric elements may include:
a first piezoelectric element disposed on one surface of the panel; and
a second piezoelectric element disposed at a position corresponding to the first piezoelectric element in the thickness direction on the other surface of the panel.

The plurality of piezoelectric elements may be arranged along a planar direction of the panel.

The panel may vibrate in a region larger than a region having a length corresponding to a distance from the inferior antihelix crus of the human ear to the antitragus and a width corresponding to a distance from the tragus to the antihelix.

The panel may partially or entirely constitute any one of a display panel, an operation panel, a cover panel, and a lid panel for allowing removal of a battery.

When the panel constitutes the display panel, the piezoelectric elements may be disposed outside a display area for executing a display function.

The panel may deform at any position thereof to deliver the air conduction sound and the vibration sound.

The panel, in a vibration region thereof, may include a plurality of positions for vibrating in a direction intersecting with a main surface of the panel, in each of which a value of amplitude of the vibration may change with time from positive to negative or vice versa.

A panel unit according to the present invention includes:
a plurality of piezoelectric elements; and
a panel to be vibrated by the plurality of piezoelectric elements that generates a vibration sound to be transmitted through a part of a human body.

Effect of the Invention

According to the present invention, an electronic apparatus that generates the vibration sound by vibrating the panel and may operate in an excellent manner may be provided.

BRIEF DESCRIPTION OF DRAWINGS

FIGS. 3A, 3B and 3C are diagrams illustrating an electronic apparatus according to a first embodiment;

DESCRIPTION OF EMBODIMENTS

Figure 1:
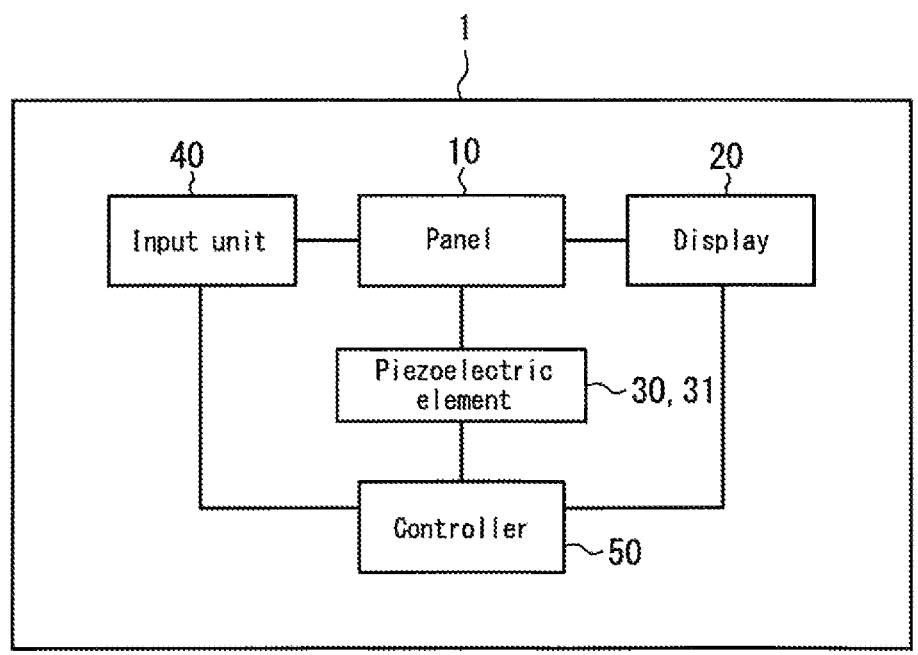
FIG. 1 is a diagram illustrating a functional block of an electronic apparatus according to one embodiment of the present invention.

Hereinafter, embodiments of the present invention will be described in detail with reference to the accompanying drawings. FIG. 1 is a diagram illustrating a functional block of an electronic apparatus 1 according to one embodiment of the present invention. The electronic apparatus 1 is a mobile phone (smart phone), for example, and includes a panel 10, a display 20, a first piezoelectric element 30, a second piezoelectric element 31, an input unit 40, and a controller 50.

The panel 10 is a touch panel for detecting a contact, or a cover panel and the like for protecting the display 20. The panel 10 is made of, for example, glass or synthetic resin such as acrylic and the like. The panel 10 preferably has a plate-like shape. The panel 10 may be a flat plate or a curved panel with a smoothly inclined surface. The panel 10 as the touch panel detects a contact by a user's finger, a pen, a stylus pen and the like. A detection method of the touch panel may be any one of an electrostatic capacitance method, a resistance film method, a surface acoustic wave method (or an ultrasound method), an infrared method, an electromagnetic induction method, a load detection method and the like.

The display 20 is a display device such as a liquid crystal display, an organic EL display, an inorganic EL display and the like. The display 20 is disposed on a rear side of the panel 10. The display 20 is disposed on the rear side of the panel 10 by using, for example, a joint member (for example, an adhesive). The display 20 may be attached to the panel 10 by using the joint member (for example, the adhesive), or disposed being spaced apart from the panel 10 and supported by a housing of the electronic apparatus 1.

The piezoelectric elements (a first piezoelectric element 30 and a second piezoelectric element 31 described below) are elements that, upon application of an electrical signal (a voltage) thereto, stretch or curve (bend) in accordance with an electromechanical coupling coefficient of a material constituting the piezoelectric elements. The piezoelectric elements may be made of, for example, ceramic or crystal. The piezoelectric elements may be unimorphs, bimorphs, or laminated piezoelectric elements. The laminated piezoelectric element includes a laminated unimorph element including laminated unimorphs (for example, 16 to 24 layers thereof), or a laminated bimorph element including laminated bimorphs (for example, 16 to 24 layers thereof). The laminated piezoelectric element has a multilayer structure including a plurality of dielectric layers made of, for example, PZT (lead zirconate titanate) and electrode layers disposed therebetween. The unimorph stretches upon application of the electrical signal (voltage), while the bimorph bends upon application of the electrical signal (voltage).

The piezoelectric elements are disposed, for example, on a rear surface of the panel 10 (an internal surface of the electronic apparatus 1). The piezoelectric elements are attached to the panel 10 by using the joint member (for example, a double-sided adhesive tape). The piezoelectric elements may be attached to the panel 10 via an intermediate member (for example, sheet metal). The piezoelectric elements are disposed on the rear surface of the panel 10 while being spaced apart from an internal surface of a housing 60 by a predetermined distance. The piezoelectric elements are preferably spaced apart from the internal surface of the housing 60 by the predetermined distance also when stretching or curving. That is, a distance between the piezoelectric elements and the internal surface of the housing 60 is preferably greater than a maximum deformation amount of the piezoelectric elements.

The input unit 40 receives an input operation from a user and is constituted by using, for example, an operation button (an operation key). When the panel 10 is the touch panel, the panel 10 may also receive the input operation from the user by detecting the contact by the user.

The controller 50 is a processor for controlling the electronic apparatus 1. The controller 50 applies a predetermined electrical signal (a voltage corresponding to a sound signal) to the piezoelectric elements (the first piezoelectric element 30 and the second piezoelectric element 31 described below). The voltage applied to the piezoelectric elements by the controller 50 may be, for example, ±15 V, which is greater than a voltage ±5 V applied to what is called a panel speaker used for the purpose of delivering sound by an air conduction sound as opposed to a vibration sound. Thereby, when the user presses the panel 10 against a user's body applying force of, for example, 3 N or greater (force of 5 N to 10 N), the panel 10 may generate sufficient vibration allowing generation of the vibration sound via a part of the user's body. Note that a level of the voltage to apply is appropriately adjustable based on fixing strength of the panel 10 to the housing or a supporting portion, or based on performance of the piezoelectric elements. When the controller 50 applies the electrical signal to the piezoelectric elements, the piezoelectric elements stretch or bend in a longitudinal direction. At this time, the panel 10 having the piezoelectric elements attached thereto deforms following the stretch or bend of the piezoelectric elements and vibrates. The panel 10 is curved due to the stretch or the bend of the piezoelectric elements. The panel 10 is bent directly by the piezoelectric elements. Note that "the panel 10 is bent directly by the piezoelectric elements" is different from a phenomenon that, as employed by a conventional panel speaker, inertial force of a piezoelectric actuator composed of the piezoelectric element disposed inside a casing excites a specific region of the panel and deforms the panel. "The panel 10 is bent directly by the piezoelectric elements" means that the stretch or the bend (curve) of the piezoelectric elements directly bends the panel via the joint member, or via the joint member and a reinforcing member 80 described below. Thereby, the panel 10 generates the air conduction sound and also, when the user brings the panel 10 into contact with a part of the user's body (for example, the cartilage of the external ear), generates the vibration sound via the part of the user's body. For example, the controller 50 may apply to the piezoelectric elements the electrical signal corresponding to a sound signal of voice of the other party so as to generate the air conduction sound and the vibration sound corresponding to the sound signal. The sound signal may be a ringtone, or music including songs. Also, the sound signal corresponding to the electrical signal may be based on music data stored in an internal storage of the electronic apparatus 1 or music data stored in an external server and the like to be replayed via the network.

The panel 10 vibrates in an attaching region having the piezoelectric elements attached thereto, as well as in a region remote from the attaching region. The panel 10, in the region to vibrate, includes a plurality of positions for vibrating in a direction intersecting with a main surface of the panel 10, in each of which a value of amplitude of the vibration changes with time from positive to negative or vice versa. The panel 10, at a certain moment, vibrates in such a manner that regions with relatively large vibration amplitude and regions with relatively small vibration amplitude are seemingly distributed in a random manner in a substantially entire panel 10. That is, over the entire panel 10, vibrations of a plurality of waves are detected. In order to prevent attenuation of the vibration of the panel 10 as described above when the user presses the panel 10 against the user's body applying the force of, for example, 5 N to 10 N, the voltage applied to the piezoelectric elements by the controller 50 may be ±15 V. Thereby, the user may hear the sound by bringing the region remote from the attaching region of the panel 10 having the piezoelectric elements attached thereto into contact with the ear.

Figure 2:
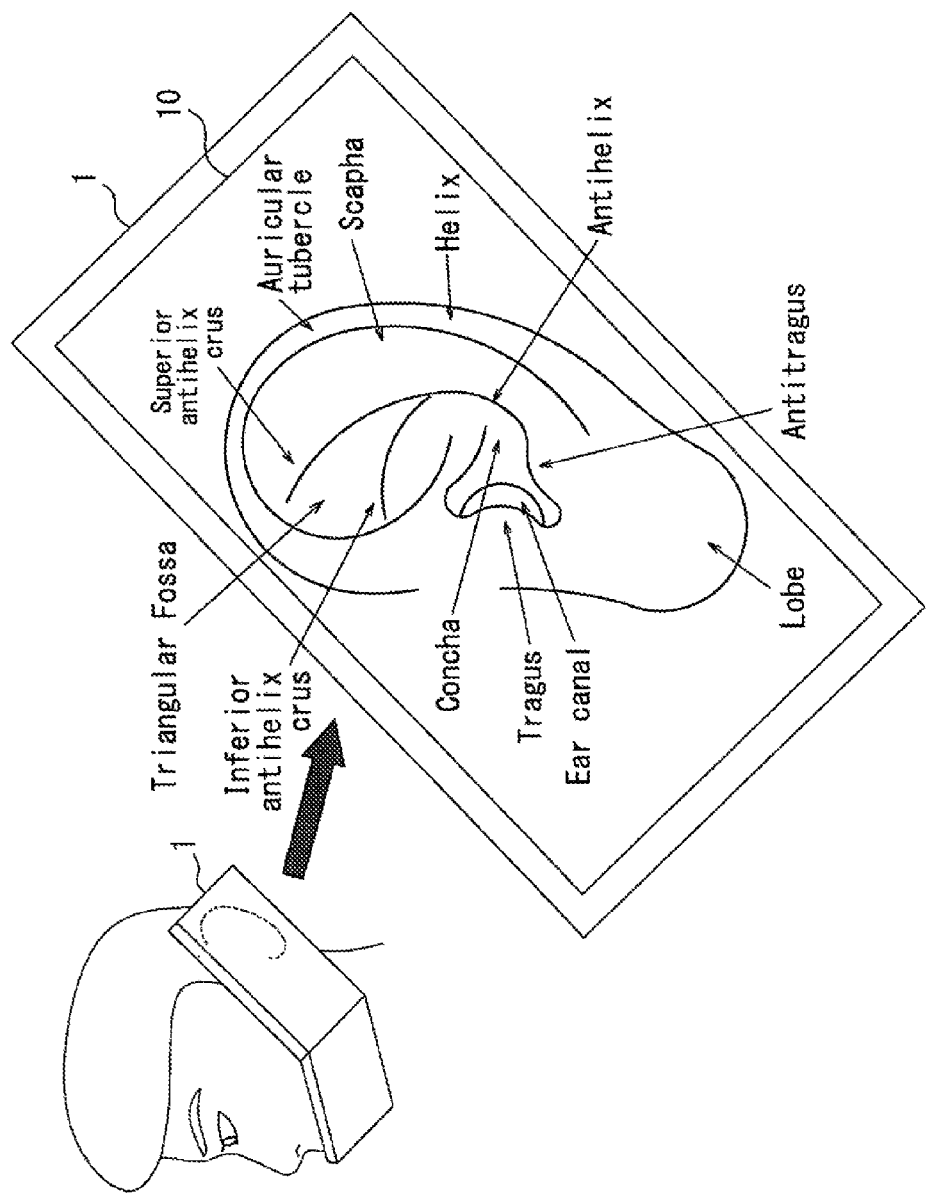
FIG. 2 is a diagram illustrating a preferred shape of a panel.

Here, the panel 10 may be in size approximately similar to the user's ear. Or, as illustrated in FIG. 2, the panel 10 may be larger than the user's ear. In this case, when the user listens to the sound, since the entire ear is likely to be covered by the panel 10 of the electronic apparatus 1, less surrounding sounds (noises) may enter the ear canal. The panel 10 needs to vibrate in a region larger than a region having a length corresponding to a distance from the inferior antihelix crus (the lower antihelix crus) to the antitragus and a width corresponding to a distance from the tragus and the antihelix. Preferably, the panel 10 vibrates in a region having a length corresponding to a distance from an area in the vicinity of the superior antihelix crus (the upper antihelix crus) of the helix to the lobe and a width corresponding to a distance from the tragus to an area in the vicinity of the antihelix of the helix. The region having the length and the width described above may be in a rectangular shape, or in an oval shape having the above length as a long diameter and the above width as a short diameter. An average ear size of Japanese people may be obtained from Database of Japanese Body Size (1992-1994) provided by Research Institute of Human Engineering for Quality Life (HQL). When the panel 10 is equal to or larger than the average ear size of Japanese people, it is considered that the panel 10 may cover most of foreign nationals' entire ears. Having the sizes and the shapes described above, the panel 10 may cover the user's ear and have an allowance for misalignment thereof with respect to the ear.

The electronic apparatus 1 described above, by vibrating the panel 10, may deliver the air conduction sound and the vibration sound that is transmitted via a part of the user's body (for example, the cartilage of the outer ear). Therefore, when sound at a volume similar to that of a conventional dynamic receiver is output, less sound is transmitted around the electronic apparatus 1 through air vibration caused by the vibration of the panel 10 as compared with that of the dynamic receiver. Accordingly, the electronic apparatus 1 is suitable for listening to, for example, a recorded message on a train or the like.

Also, the electronic apparatus 1 described above generates a sound of the vibration of the panel 10 caused by the piezoelectric elements transmitted through the human body. The sound transmitted through the human body, via the soft tissue (for example, the cartilage), vibrates the middle ear or the inner ear. Since the electronic apparatus 1 described above delivers the vibration sound by vibrating the panel 10, when the user is wearing, for example, earphones or headphones, the user may hear the sound via the earphones or the headphones and a part of the user's body by bringing the electronic apparatus 1 into contact with the earphones or the headphones.

The electronic apparatus 1 described above delivers the sound to the user by vibrating the panel 10. Therefore, when the electronic apparatus 1 does not separately include the dynamic receiver, an opening (a sound opening) for voice transmission does not need to be formed on the housing, which allows simplification of a waterproof structure of the electronic apparatus 1. Note that, when the electronic apparatus 1 has the dynamic receiver, the sound opening is preferably sealed with a material that ventilates while blocking liquid. Such a material for ventilating while blocking liquid is, for example, Gore-Tex (registered trademark).

First Embodiment

FIGS. 3A, 3B and 3C are diagrams illustrating a housing structure of the electronic apparatus 1 according to a first embodiment. FIG. 3A is a front view, FIG. 3B is a cross-sectional view taken from line b-b of FIG. 3A, and FIG. 3C is a cross-sectional view taken from line c-c of FIG. 3A. The electronic apparatus 1 illustrated in FIGS. 3A, 3B and 3C is a smartphone having a touch panel made of a glass plate serving as the panel 10 disposed on a front side of the housing 60 (for example, a metal or resin case). The panel 10 and the input unit 40 are supported by the housing 60, and each of the display 20 and the first piezoelectric element 30 is attached to the panel 10 by a joint member 70. The joint member 70 is a thermocurable adhesive, an ultraviolet curable adhesive, the double-sided adhesive tape or the like and may be made of an optical elasticity resin such as, for example, a colorless and transparent acrylic ultraviolet curable adhesive. Each of the panel 10, the display 20, the first piezoelectric element 30, and the second piezoelectric element 31 has a substantially rectangular shape.

The display 20 is disposed substantially in the center of a short direction of the panel 10. The first piezoelectric element 30 is disposed being spaced apart from an end of a longitudinal direction of the panel 10 by a predetermined distance in the vicinity of the end in such a manner that a longitudinal direction of the piezoelectric element 30 faces along the short direction of the panel 10. The display 20 and the first piezoelectric element 30 are disposed side by side in a direction parallel to an internal surface of the panel 10.

The second piezoelectric element 31 is attached to the first piezoelectric element 30 via the joint member 70. The second piezoelectric element 31 is disposed overlapping with the first piezoelectric element 30. The second piezoelectric element 31 is disposed overlapping with the panel 10 and the first piezoelectric element 30.

Here, when the piezoelectric element is, for example, a ceramic bimorph, the piezoelectric element deforms more as a thickness thereof is smaller. That is, the smaller the thickness is, the harder the piezoelectric element becomes damaged by an external force or its own deformation. On the other hand, when the thickness of the piezoelectric element is relatively small, the magnitude of the vibration of the panel 10 becomes relatively small, too. For example, when comparing between vibration of the panel 10 caused by the 16-layer bimorph and vibration of the panel 10 caused by the 24-layer bimorph, the vibration of the panel 10 caused by the 16-layer bimorph is smaller. In other words, a sound pressure of the sound generated from the panel 10 is smaller.

The electronic apparatus 1 according to the first embodiment includes a plurality of piezoelectric elements, with which the electronic apparatus 1 vibrates the panel 10. For example, it is now assumed that each of the first piezoelectric element 30 and the second piezoelectric element 31 is a 12-layer bimorph, whereby the panel 10 is vibrated. In this case, as compared with a case in which the panel 10 is vibrated by one 24-layer bimorph, the magnitude of the vibration of the panel 10 is prevented from being greatly impaired, and the possibility that the first piezoelectric element 30 and the second piezoelectric element 31 are damaged due to an external force or their own deformation may be reduced. Also, since the first piezoelectric element 30 and the second piezoelectric element 31 are in the lamination arrangement, a volume of the piezoelectric elements occupying in a planar direction of the panel 10 is reduced, allowing an effective use of the space inside the housing along the planar direction of the panel 10.

Further, the first piezoelectric element 30 and the second piezoelectric element 31 are joined together by the joint member 70 having elasticity such as a double-sided tape and the like. Therefore, in the configuration illustrated in FIGS. 3A, 3B and 3C, for example, the freedom of the deformation of the first piezoelectric element 30 and the second piezoelectric element 31 is ensured and, when both the first piezoelectric element 30 and the second piezoelectric element 31 deform, each of them is unlikely to be separated from the joint member due to their deformation caused by elastic deformation of the joint member.

Figure 4A:
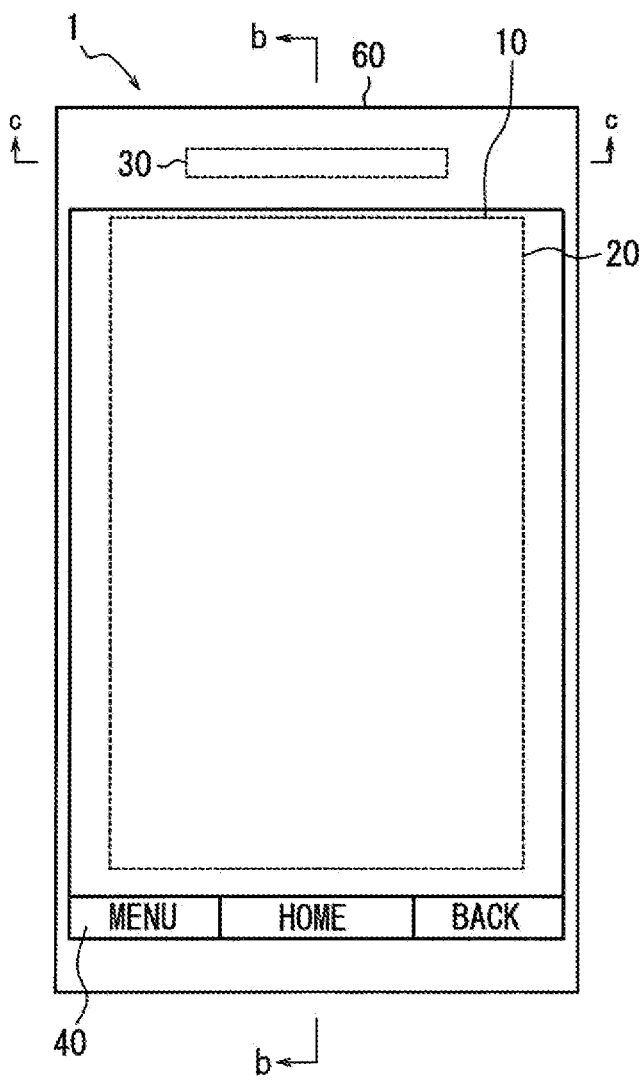
FIGS. 4A, 4B and 4C are diagrams illustrating an electronic apparatus according to an exemplary variation of the first embodiment.
Figure 4B:
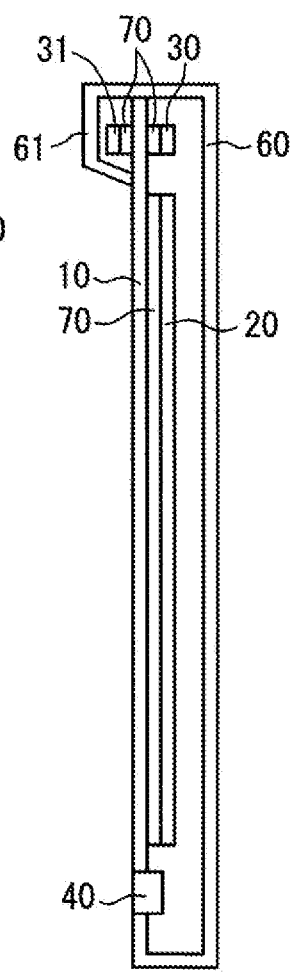
Figure 4C:
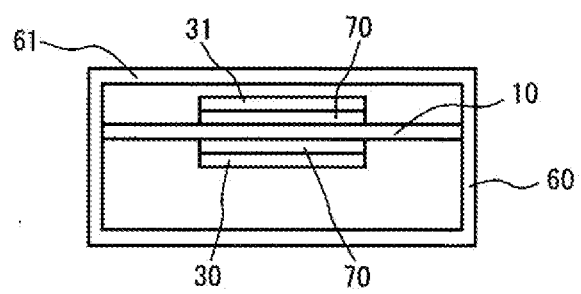

FIGS. 4A, 4B and 4C are diagrams illustrating an electronic apparatus 1 according to an exemplary variation of the first embodiment. FIG. 4A is a front view, FIG. 4B is a cross-sectional view taken from line b-b of FIG. 4A, and FIG. 4C is a cross-sectional view taken from line c-c of FIG. 4A.

Similarly to FIGS. 3A, 3B and 3C, the first piezoelectric element 30 is attached to the surface of the panel 10 inside the housing by using the joint member 70. The first piezoelectric element 30 is disposed being spaced apart from the end of the longitudinal direction of the panel 10 by a predetermined distance in the vicinity of the end in such a manner that the longitudinal direction of the piezoelectric element 30 faces along the short direction of the panel 10. The display 20 and the first piezoelectric element 30 are disposed side by side in a direction parallel to the internal surface of the panel 10.

The second piezoelectric element 31 is attached to an outer surface of the panel 10 outside the housing by using the joint member 70. The second piezoelectric element 31 is disposed at a position corresponding to the first piezoelectric element 30 in a thickness direction of the panel 10. The first piezoelectric element 30 and the second piezoelectric element 31 overlap with each other in the thickness direction of the panel 10 in a planar view of the panel 10 (in the perspective of FIG. 4A).

As illustrated in FIG. 4B, the second piezoelectric element 31 is covered by a visor portion 61 extending from the housing 60. Therefore, the visor portion 61 may reduce damage to the second piezoelectric element 31 caused by an external force applied thereto. Also, an end portion of the visor portion 61 facing the input unit 40 abuts on the panel 10 between a region of the panel 10 where the first piezoelectric element 30 and the second piezoelectric element 31 are disposed and a region where the display 20 is disposed. Therefore, the visor portion 61 is less likely to block the display of the display 20.

Figure 5A:
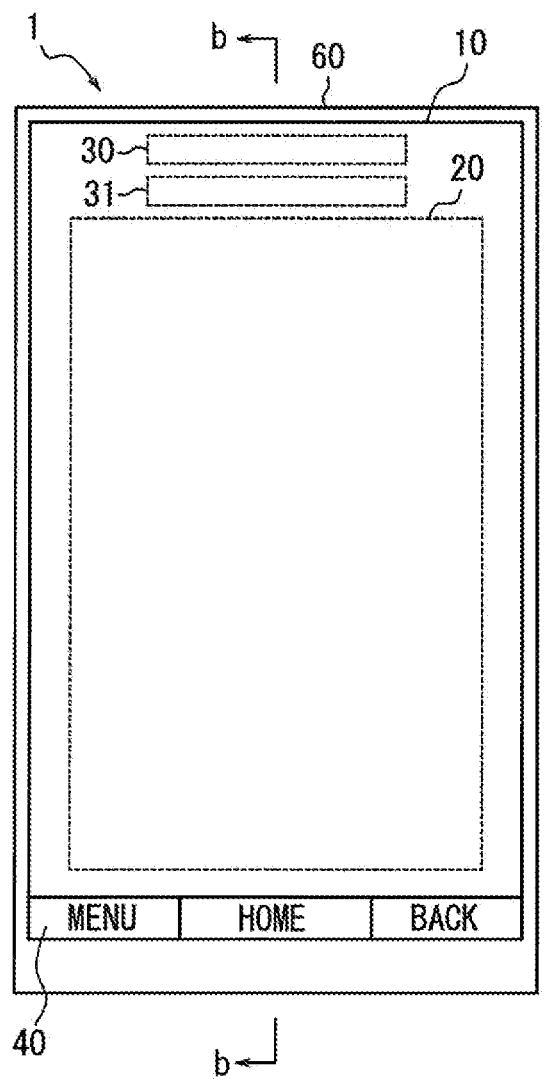
FIGS. 5A and 5B are diagrams illustrating an electronic apparatus according to another exemplary variation of the first embodiment.
Figure 5B:
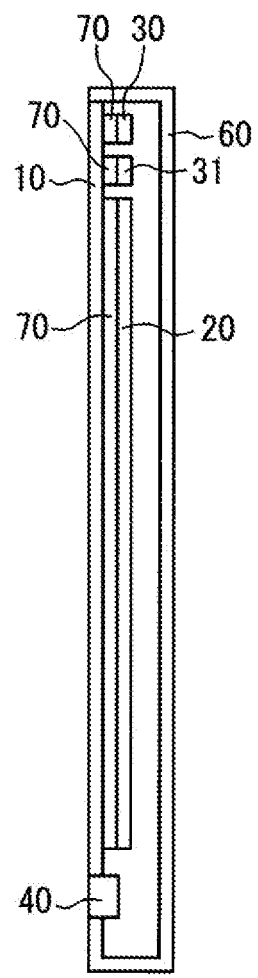

FIGS. 5A and 5B are diagrams illustrating the electronic apparatus 1 according to another exemplary variation of the first embodiment. FIG. 5A is a front view, and FIG. 5B is a cross-sectional view taken from line b-b of FIG. 5A.

In the electronic apparatus 1 according to the another exemplary variation, the first piezoelectric element 30 and the second piezoelectric element 31 are arranged along the planar direction of the panel 10. The first piezoelectric element 30 and the second piezoelectric element 31 are disposed being spaced apart from the end of the longitudinal direction of the panel 10 by a predetermined distance in the vicinity of the end. The first piezoelectric element 30 and the second piezoelectric element 31 are arranged having longitudinal directions thereof facing along the short direction of the panel 10. The first piezoelectric element 30 and the second piezoelectric element 31 are disposed in parallel with the panel 10.

In the electronic apparatus 1 according to the another exemplary variation, since the first piezoelectric element 30 and the second piezoelectric element 31 are arranged along the planar direction of the panel 10, the volume of the piezoelectric elements occupying in a thickness direction of the housing 60 is reduced, allowing a reduction in thickness of the electronic apparatus 1.

Note that, although FIGS. 5A and 5B illustrate the example in which the first piezoelectric element 30 and the second piezoelectric element 31 are arranged in parallel with each other in the vicinity of the end of the longitudinal direction of the panel 10, positions and orientations of first piezoelectric element 30 and the second piezoelectric element 31 mounted on the panel are not limited thereto. The first piezoelectric element 30 and the second piezoelectric element 31 may be mounted on the internal surface of the panel 10 being orthogonal to each other. Or, the first piezoelectric element 30 may be disposed in the vicinity of one end of the longitudinal direction of the panel 10, while the second piezoelectric element 31 may be disposed in the vicinity of the other end of the longitudinal direction of the panel 10. Or, the first piezoelectric element 30 may be disposed in the vicinity of one end of the short direction of the panel 10, while the second piezoelectric element 31 may be disposed in the vicinity of the other end of the short direction of the panel 10.

Figure 6:
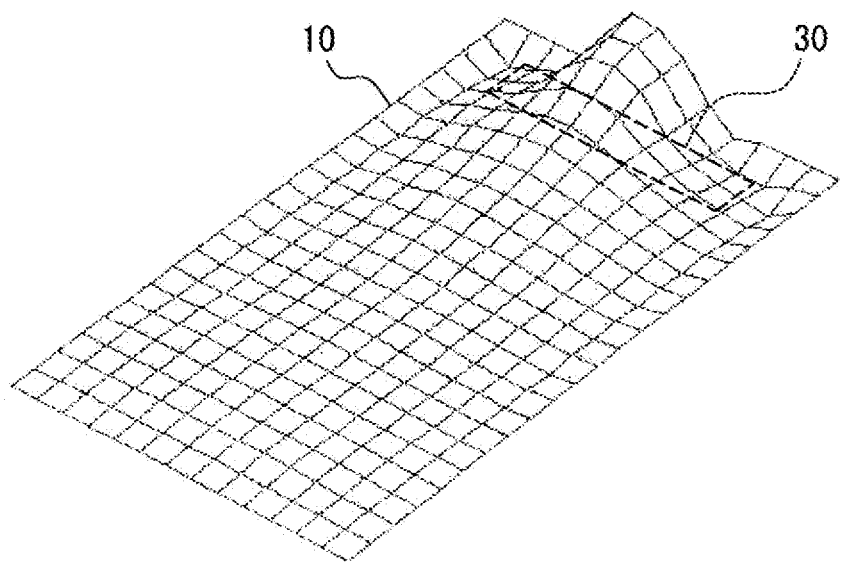
FIG. 6 is a diagram illustrating an example of vibration of the panel of the electronic apparatus according to the first embodiment.

FIG. 6 is a diagram illustrating an example of the vibration of the panel 10 of the electronic apparatus 1 according to the first embodiment. In the electronic apparatus 1 according to the first embodiment, the display 20 is attached to the panel 10. Therefore, a lower portion of the panel 10 is less likely to vibrate as compared with an upper portion of the panel 10 to which the piezoelectric element 30 is attached. Accordingly, the lower portion of the panel 10 may reduce sound leakage caused by the vibration thereof. The upper portion of the panel 10 is directly bent by the piezoelectric element 30, while the vibration is attenuated in the lower portion as compared with the upper portion. The panel 10 is bent by the piezoelectric element 30 in such a manner that a portion of the panel 10 directly above the piezoelectric element 30 in the longitudinal direction of the piezoelectric element 30 is raised the highest as compared with its surroundings.

According to the electronic apparatus 1 of the present embodiment, as described above, the panel 10 deforms due to the deformation of the piezoelectric elements attached to the rear surface of the panel 10 and thus delivers the air conduction sound and the vibration sound to an object in contact with the panel 10 that is deforming. Thus, without the necessity to protrude the vibrator on an outer surface of the housing 60, the air conduction sound and the vibration sound may be delivered to the user. Therefore, the electronic apparatus 1 has better usability than an electronic apparatus described in Patent Document 1 that requires a vibrator, which is very small as compared with a housing, to be brought into contact with the human body. Also, since there is no need to bring the piezoelectric element itself into contact with the user's ear, the piezoelectric element 30 is unlikely to be damaged. Further, deformation of the housing 60 in place of the panel 10 is likely to cause the user to drop a terminal upon generation of the vibration, whereas the vibration of the panel 10 is less likely to cause such an accident.

Also, the piezoelectric elements are joined to the panel 10 by using the joint member 70. Therefore, the piezoelectric elements may be attached to the panel 10 in such a manner that the degree of freedom of the deformation of the piezoelectric elements are unlikely to be inhibited. Also, the joint member 70 may be a non-thermocurable adhesive. This offers an advantage that, during curing, thermal stress shrinkage is hardly occurred between the piezoelectric elements and the panel 10. Or, the joint member 70 may be the double-sided tape. This offers an advantage that shrinkage stress, which is caused in using the adhesive, is hardly applied between the piezoelectric element and the panel 10.

As described above, the electronic apparatus 1 according to the first embodiment has been described with reference to FIGS. 3A, 3B and 3C to FIGS. 5A and 5B. However, the present invention is not limited to the embodiment described above but includes any modifications and alternative configurations that may be created by a person who is ordinarily skilled in the art.

For example, although the electronic apparatus 1 according to the first embodiment includes the first piezoelectric element 30 and the second piezoelectric element 31, the configuration of the electronic apparatus 1 is not limited thereto. The electronic apparatus 1 may include more piezoelectric elements. In particular, in the configuration illustrated in FIG. 3, for example, a third piezoelectric element may be attached to the second piezoelectric element 31 by using a joint member.

Also, a plurality of piezoelectric elements may be bimorphs having different number of layers.

Further, although in the above description both the joint member for attaching the first piezoelectric element to the panel and the joint member for attaching the second piezoelectric element to the panel or to the first piezoelectric element are commonly denoted by the reference sign 70, different joint members may be appropriately used according to the members to be joined.

Second Embodiment

Figure 7A:
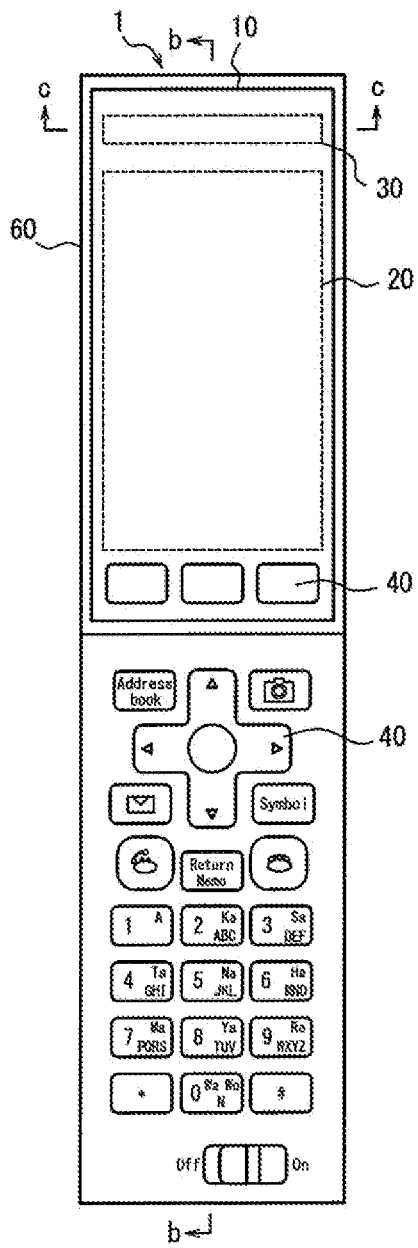
FIGS. 7A, 7B, 7C and 7D are diagrams illustrating an electronic apparatus according to a second embodiment.
Figure 7B:
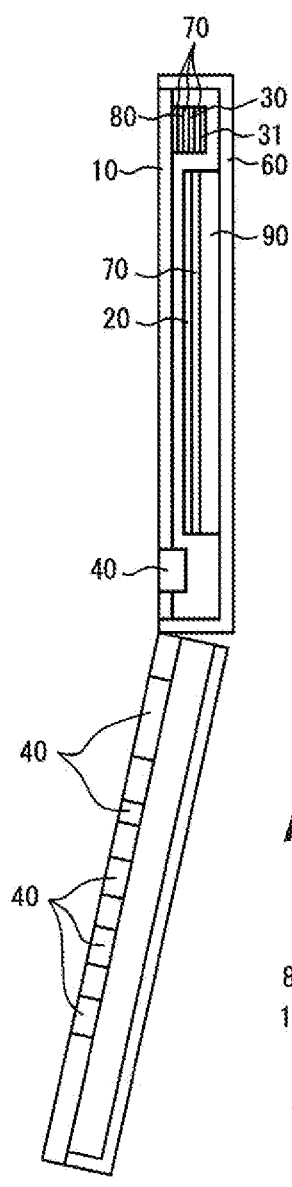

FIGS. 7A, 7B, 7C and 7D are diagrams illustrating a housing structure of the electronic apparatus 1 according to a second embodiment. FIG. 7A is a front view, and FIG. 7B is a cross-sectional view taken from line b-b of FIG. 7A.

Figure 7C:
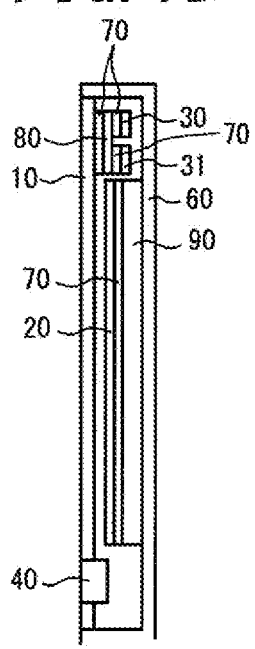
Figure 7D:
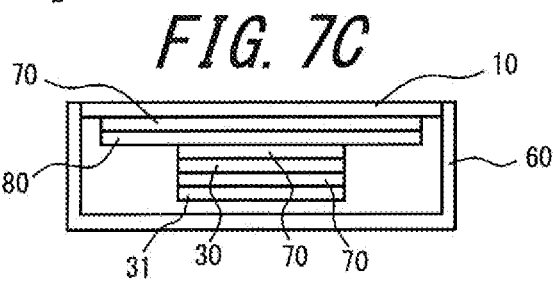

FIG. 7C is a cross-sectional view taken from line c-c of FIG. 7A, and FIG. 7D is a diagram of the electronic apparatus 1 according to an exemplary variation of the second embodiment viewed from a viewpoint similar to that of FIG. 7B The electronic apparatus 1 illustrated in FIGS. 7A, 7B, 7C and 7D is a folding mobile phone terminal having a cover panel (acryl plate) serving as the panel 10 for protecting the display 20 disposed on a front side of an upper portion of the housing 60. According to the second embodiment, the reinforcing member 80 is disposed between the panel 10 and the piezoelectric element 30.

The reinforcing member 80 is, for example, an elastic member made of rubber or silicon. Or, the reinforcing member 80 may be a metal plate made of, for example, aluminum and the like having elasticity to a certain degree. Or, the reinforcing member 80 may be a resin plate. Here, resin for forming the resin plate may be, for example, a polyamide resin. As the polyamide resin, there is, for example, Lenny (registered trademark) made of a crystalline thermoplastic resin obtained from m-xylylenediamine and adipic acid and having high strength and elasticity. Such a polyamide resin may be, having itself as a base polymer, reinforced by using glass fibers, metal fibers, carbon fibers or the like. According to an amount of the glass fibers, the metal fibers, or the carbon fibers added to the polyamide resin, the strength and the elasticity are appropriately adjusted. The reinforced resin as described above is formed by, for example, impregnating a substrate formed by knitting the glass fibers, the metal fibers, or the carbon fibers with the resin and then allowing the resulting material to cure. Or, the reinforced resin may be formed by mixing fine fiber pieces into a liquid resin and allowing thus obtained resin to cure. Or, the reinforced resin may be composed of a lamination of the substrate formed of knitted fibers and a resin layer.

That is, the electronic apparatus 1 according to the second embodiment has a structure in which the second piezoelectric element 31 and the first piezoelectric element 30 are joined together by using the joint member 70, and the first piezoelectric element 30 and the reinforcing member 80 are joined together by using the joint member 70 and, further, the intermediate member 80 and the panel 10 are joined together by using the joint member 70. According to the second embodiment, also, the display 20 is supported by the housing 60 instead of being attached to the panel 10. That is, the electronic apparatus 1 according to the second embodiment has a structure in which the display 20 is spaced apart from the panel 10, and the display 20 and a supporting portion 90, which is a portion of the housing 60, are joined together by using the joint member 70. Note that the supporting portion 90 does not need to be the portion of the housing 60 but may be a metal or resin member independent from the housing 60. As illustrated in FIG. 7D, also, the first piezoelectric element 30 and the second piezoelectric element 31 may be arranged in parallel with the reinforcing member 80.

Figure 8:
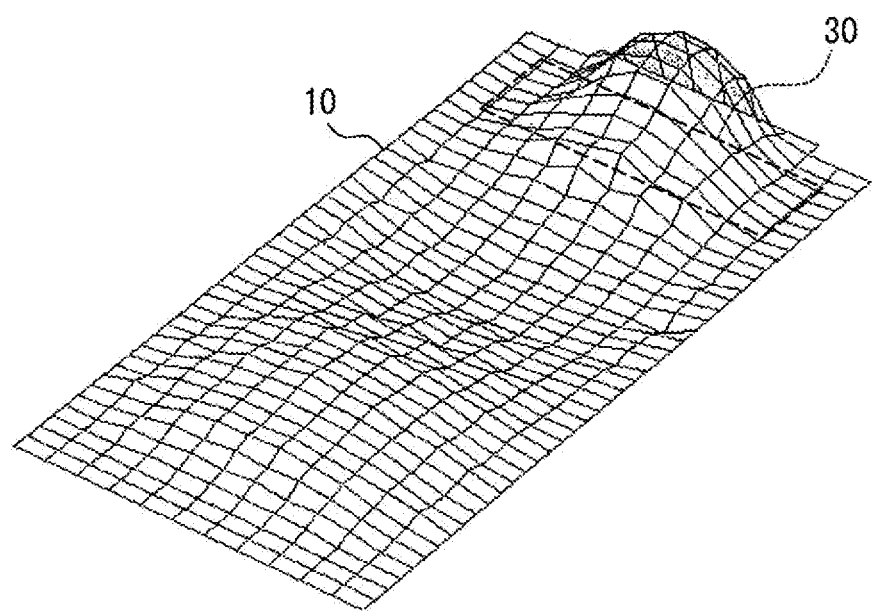
FIG. 8 is a diagram illustrating an example of vibration of the panel of the electronic apparatus according to the second embodiment.

FIG. 8 is a diagram illustrating an example of the vibration of the panel 10 of the electronic apparatus 1 according to the second embodiment. In the electronic apparatus 1 according to the second embodiment, since the panel 10 is an acrylic plate having lower rigidity than that of the glass plate and, also, the display 20 is not attached to the rear surface of the panel 10, amplitude of the vibration generated by the piezoelectric element 30 is larger than that of the electronic apparatus 1 according to the first embodiment illustrated in FIGS. 4A, 4B and 4C. Also, the panel 10 vibrates in the attaching region having the piezoelectric element 30 attached thereto, as well as in the region remote from the attaching region. Accordingly, the user may hear the air conduction sound via the air and also the vibration sound by bringing any region of the panel 10 into contact with the ear.

According to the electronic apparatus 1 of the present embodiment, as described above, due to the deformation of the piezoelectric elements attached to the rear surface of the panel 10 via the reinforcing member 80, the reinforcing member 80 and the panel 10 deform, thereby delivering the air conduction sound and the vibration sound to an object in contact with the panel 10 that is deforming. Accordingly, without the necessity to bring the vibrator itself into contact with the ear, the air conduction sound and the vibration sound may be delivered to the user. Also, the piezoelectric elements are attached to the internal surface of the panel 10 inside the housing 60. Accordingly, without the necessity to protrude the vibrator on the outer surface of the housing 60, the air conduction sound and the vibration sound may be delivered to the user. Further, the panel 10 deforms transmitting the air conduction sound and the vibration sound in the attaching region having the piezoelectric element 30 attached thereto, as well as in any region thereof. Accordingly, the user may hear the air conduction sound via the air and also the vibration sound by bringing any region of the panel 10 into contact with the ear.

Further, since the reinforcing member 80 is disposed between the piezoelectric elements and the panel 10, the possibility that an external force applied to the panel 10 is transmitted to and damaging the piezoelectric elements may be reduced. Also, when the panel 10 is brought into hard-contact with the human body, the vibration of the panel 10 is less attenuated. Also, as compared with a structure in which, without using the reinforcing member 80, the piezoelectric elements are attached to the panel 10 by using the joint member 70, the piezoelectric elements are less likely to deform excessively. Thereby, a deformation amount (a degree of deformation) of the panel 10 may be adjusted. This configuration is effective especially when the panel 10 is less likely to inhibit the deformation of the piezoelectric element. Further, since the reinforcing member 80 is disposed between the piezoelectric elements and the panel 10, a resonance frequency of the panel 10 is lowered and acoustic characteristics in a low frequency band is improved. Note that, in place of the reinforcing member 80, a plate-shaped weight may be attached to the piezoelectric elements by using the joint member 70.

The second embodiment, similarly to the first embodiment, is not limited to the example illustrated in FIGS. 7A, 7B, 7C and 7D but also includes any modifications and alternative configurations that may be created by a person who is ordinarily skilled in the art.

For example, the electronic apparatus 1 illustrated in FIGS. 7A, 7B, 7C and 7D has a structure in which the panel 10, the reinforcing member 80, the first piezoelectric element 30, and the second piezoelectric element 31 are laminated in the mentioned order and attached to one another by using the joint member 70 disposed between each of them. However, the structure of the electronic apparatus 1 is not limited thereto. For example, the panel 10, the first piezoelectric element 30, the reinforcing member 80, and the second piezoelectric element 31 may be laminated in the mentioned order and attached to one another by using the joint member 70 disposed between each of them. That is, the reinforcing member 80 may be disposed between the first piezoelectric element 30 and the second piezoelectric element 31. In this structure, since the reinforcing member 80 is attached to both the first piezoelectric element 30 and the second piezoelectric elements 31, both the first piezoelectric element 30 and second piezoelectric element 31 are less likely to deform excessively. The reinforcing member 80 may be disposed opposite to the first piezoelectric element 30 with respect to the second piezoelectric element 31.

Although the present invention has been described based on the figures and the embodiments, it is to be understood that various changes and modifications may be implemented based on the present disclosure by those who are ordinarily skilled in the art. Accordingly, such changes and modifications are included in the scope of the present invention. For example, functions and the like included in each member, each step and the like may be rearranged without logical inconsistency, so as to combine a plurality of components or steps together or to divide them.

Figure 9:
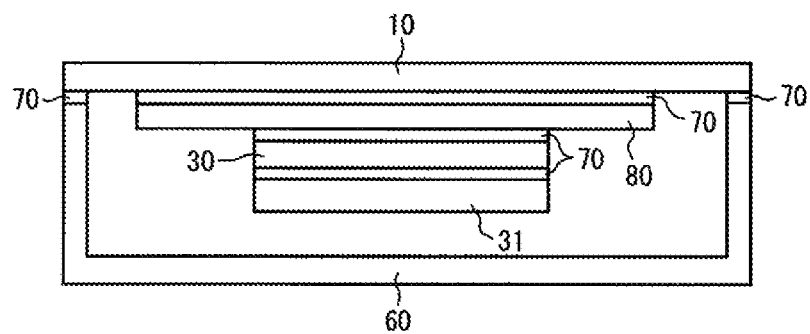
FIG. 9 is a diagram illustrating an example of attachment of the panel and a housing.

As illustrated in FIG. 9, for example, the panel 10 may be attached to the housing 60 by using the joint member 70. Thereby, the vibration from the panel 10 is hardly delivered directly to the housing 60 and therefore, as compared with a structure in which the housing 60 itself greatly vibrates, a risk that the user drops the electronic apparatus 1 may be reduced. Also, the joint member 70 may be the non-thermocurable adhesive, which offers an advantage that, during curing, the thermal stress shrinkage is hardly generated between the housing 60 and the panel 10. Or, the joint member 70 may be the double-sided adhesive tape, which offers an advantage that shrinkage stress, which is caused in using the adhesive, is hardly applied between the housing 60 and the panel 10.

For example, when the electronic apparatus 1 has a structure in which the panel 10 and the display 20 do not overlap with each other, the piezoelectric element may be disposed in the center of the panel 10. When the piezoelectric element is disposed in the center of the panel 10, the vibration of the piezoelectric element is delivered uniformly to the entire panel 10, whereby quality of the air conduction sound may be improved and the user may recognize the vibration sound by bringing various regions of the panel 10 into contact with the ear. Similarly to the above embodiment, a plurality of piezoelectric elements may be attached.

Also, although the electronic apparatus 1 described above has a structure in which the piezoelectric elements are attached to the panel 10, the piezoelectric elements may be attached elsewhere. For example, the piezoelectric elements may be attached to a battery lid that is attached to the housing 60 for covering a battery. In the electronic apparatus 1 such as the mobile phone terminal and the like, since the battery lid is often attached to a plane different from a plane having the panel 10, such structure allows the user to hear the sound by bringing a surface other than the one with the panel 10 into contact with a part of the user's body (for example, the ear).

Further, the panel 10 may partially or entirely constitute any one of a display panel, an operation panel, the cover panel, a lid panel for allowing removal of the battery. Especially when the panel 10 constitutes the display panel, the piezoelectric elements are disposed outside a display area for executing a display function. This offers an advantage that a display is hardly inhibited. The operation panel includes the touch panel of the first embodiment. Or, the operation panel includes a sheet key, which is a member having a key top of operation keys of, for example, the folding mobile phone integrally formed thereon and forming one plane of the housing having an operation unit.

Note that, although in the first embodiment and the second embodiment both the joint member for joining the panel 10 and the piezoelectric elements together and the joint member for joining the panel 10 and the housing 60 together are commonly denoted by the reference sign 70, different joint members may be appropriately used according to the members to be joined in the first embodiment and the second embodiment.

REFERENCE SIGNS LIST

1 electronic apparatus
10 panel
20 display
30 first piezoelectric element
31 second piezoelectric element
40 input unit
50 controller
60 housing
70 joint member
80 reinforcing member
90 supporting portion

The invention claimed is:

1. An electronic apparatus comprising:
   a housing;
   a plurality of piezoelectric elements; and
   a panel to be vibrated by the plurality of piezoelectric elements that generates a vibration sound to be transmitted through a part of a human body, wherein
   the plurality of piezoelectric elements are arranged overlapping with one another in a thickness direction of the panel, wherein the panel has a first, exterior-facing surface and a second, interior-facing surface opposite the first, exterior-facing surface, and the plurality of piezoelectric elements include:
      a first piezoelectric element disposed on a portion of the panel that is enclosed by a visor portion extending from the housing and coplanar with the first, exterior-facing surface of the panel; and
      a second piezoelectric element disposed on the second, interior-facing surface of the panel at a position opposite to the first piezoelectric element in the thickness direction.

2. The electronic apparatus according to claim 1, wherein the panel generates the vibration sound and an air conduction sound.

3. The electronic apparatus according to claim 1, wherein the panel vibrates in a region larger than a region having a length corresponding to a distance from the inferior antihelix crus of the human ear to the antitragus and a width corresponding to a distance from the tragus to the antihelix.

4. The electronic apparatus according to claim 1, wherein the panel partially or entirely constitutes any one of a display panel, an operation panel, a cover panel, and a lid panel for allowing removal of a battery.

5. The electronic apparatus according to claim 4, wherein, when the panel constitutes the display panel, the piezoelectric elements are disposed outside a display area for executing a display function.

6. The electronic apparatus according to claim 1, wherein the panel deforms at any position thereof to deliver the air conduction sound and the vibration sound.

7. The electronic apparatus according to claim 1, wherein the panel, in a vibration region thereof, includes a plurality of positions for vibrating in a direction intersecting with a main surface of the panel, in each of which a value of amplitude of the vibration changes with time from positive to negative or vice versa.

8. A panel unit for an electronic apparatus comprising the panel unit, a housing for the panel unit, and a visor portion extending from the housing, the panel unit comprising:
   a plurality of piezoelectric elements; and
   a panel to be vibrated by the plurality of piezoelectric elements that generates a vibration sound to be transmitted through a part of a human body, wherein
   the plurality of piezoelectric elements are arranged overlapping with one another in a thickness direction of the panel, wherein the panel has a first, exterior-facing surface and a second, interior-facing surface opposite the first, exterior-facing surface, and the plurality of piezoelectric elements include:
      a first piezoelectric element disposed on a portion of the panel that is enclosed by the visor portion and coplanar with the first, exterior-facing surface of the panel; and
      a second piezoelectric element disposed on the second, interior-facing surface of the panel at a position opposite to the first piezoelectric element in the thickness direction.

\* \* \* \* \*